(12) United States Patent
Gunderson et al.

(10) Patent No.: US 8,699,172 B1
(45) Date of Patent: Apr. 15, 2014

(54) DISK DRIVE GENERATING OFF-TRACK READ CAPABILITY FOR A PLURALITY OF TRACK SEGMENTS

(75) Inventors: Daniel J. Gunderson, Lake Forest, CA (US); Richard T. Curran, Los Altos, CA (US); Lloyd E. Levy, San Jose, CA (US); Bruce C. Schardt, Rancho Santa Margarita, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 385 days.

(21) Appl. No.: 13/028,603

(22) Filed: Feb. 16, 2011

(51) Int. Cl.
*G11B 21/02* (2006.01)

(52) U.S. Cl.
USPC .......................................................... 360/75

(58) Field of Classification Search
None
See application file for complete search history.

(56) References Cited

U.S. PATENT DOCUMENTS

| | | | |
|---|---|---|---|
| 6,445,521 B1 | 9/2002 | Schaff et al. |
| 6,680,609 B1 | 1/2004 | Fang et al. |
| 6,788,489 B1 | 9/2004 | Chang et al. |
| 7,027,255 B2 | 4/2006 | Schmidt |
| 7,529,050 B2 | 5/2009 | Shen et al. |
| 2009/0034380 A1 | 2/2009 | Ngwe et al. |

*Primary Examiner* — K. Wong

(57) ABSTRACT

A disk drive is disclosed comprising a head actuated over a disk comprising a plurality of tracks. Data is read from a target track, and an off-track read capability (OTRC) is generated for a plurality of segments of the target track. For example, an OTRC may be generated for a plurality of data sectors, wherein the combined OTRCs may be evaluated to compute an average track center, or an average track width, or a repeatable runout (RRO).

32 Claims, 6 Drawing Sheets

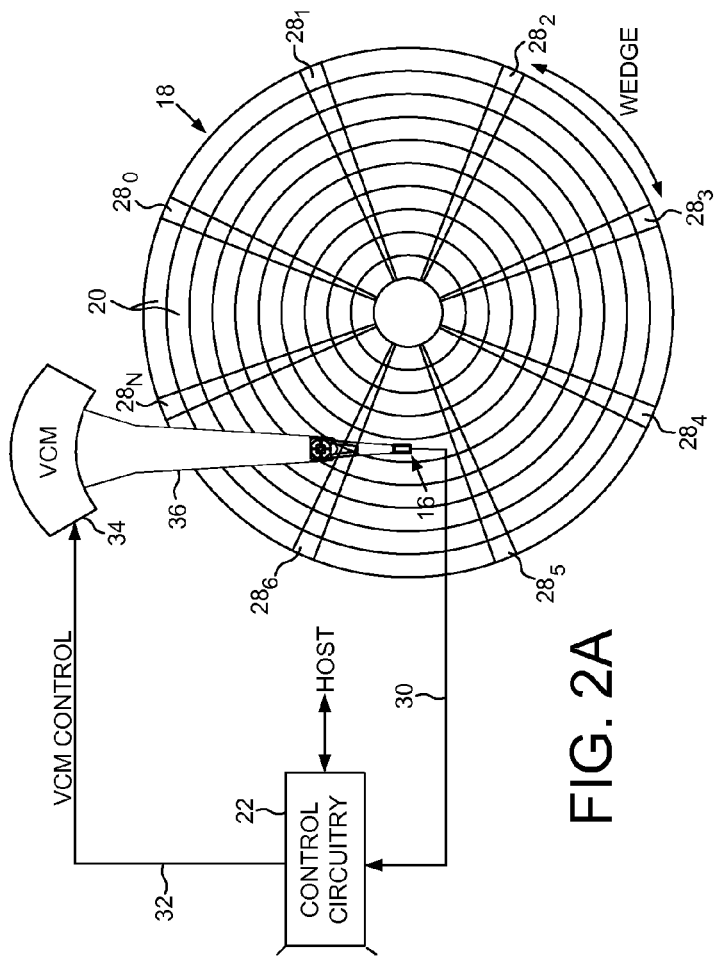
FIG. 2A
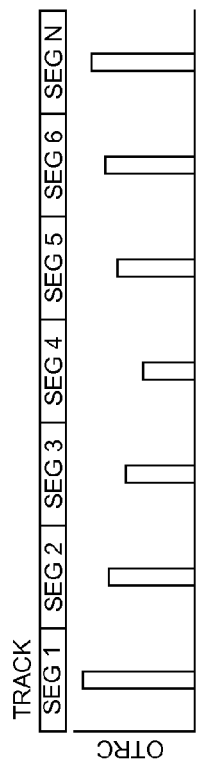
FIG. 2B
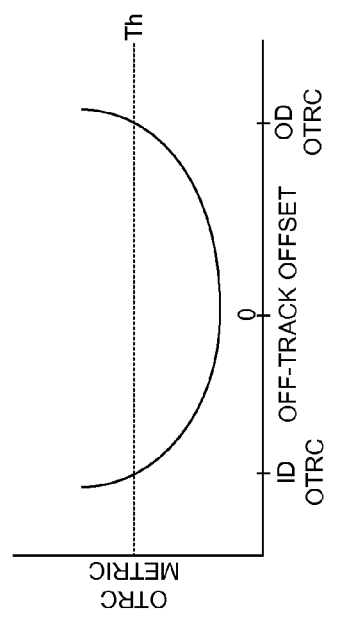
FIG. 2C
FIG. 2D $$\text{OTRC METRIC} = \frac{\text{NO. OF SECTORS IN ERROR}}{\text{TOTAL NO. OF SECTORS READ}}$$

FIG. 4A $$\text{OTRC METRIC} = \frac{\text{NO. OF SYMBOLS IN ERROR}}{\text{TOTAL NO. OF SYMBOLS READ}}$$

FIG. 4B $$\text{OTRC METRIC} = \frac{\text{NO. OF BITS IN ERROR}}{\text{TOTAL NO. OF BITS READ}}$$

FIG. 4C $$\text{OTRC METRIC} = \frac{\text{NO. OF CHANNEL METRICS} > \text{Th}}{\text{TOTAL NO. OF CHANNEL METRICS}}$$

FIG. 4D

DISK DRIVE GENERATING OFF-TRACK READ CAPABILITY FOR A PLURALITY OF TRACK SEGMENTS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together to form a plurality of zones.

The prior art disk format of FIG. 1 also shows a number of servo sectors $6_0$-$6_N$ that define the data tracks 4. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

BRIEF DESCRIPTION OF THE DRAWINGS

FIG. 2A shows a disk drive according to an embodiment of the present invention comprising a head actuated over a disk.

FIG. 2B is a flow diagram according to an embodiment of the present invention wherein data is read from a target track and an off-track read capability (OTRC) is generated for a plurality of segments of the target track.

FIG. 2C shows an embodiment of the present invention wherein an OTRC is generated for an inner diameter side of the target track and for an outer diameter side of the target track.

FIG. 2D shows an embodiment of the present invention wherein an OTRC generated for each segment of the target track may vary in a sinusoidal manner due to a repeatable runout of the target track.

FIG. 4A shows an embodiment of the present invention wherein the OTRC metric comprises a ratio of a number of data sectors in error to a total number of data sectors read.

FIG. 4B shows an embodiment of the present invention wherein the OTRC metric comprises a ratio of a number of error correction code (ECC) symbols in error to a total number of ECC symbols read.

FIG. 4C shows an embodiment of the present invention wherein the OTRC metric comprises a ratio of a number of bits in error to a total number of bits read.

FIG. 4D shows an embodiment of the present invention wherein the OTRC metric comprises a ratio of a number of channel metrics that exceed a threshold to a total number of channel metrics generated.

DETAILED DESCRIPTION OF EMBODIMENTS OF THE INVENTION

FIG. 2A shows a disk drive according to an embodiment of the present invention comprising a head 16 actuated over a disk 18 comprising a plurality of tracks 20. The disk drive further comprises control circuitry 22 operable to execute the flow diagram of FIG. 2B wherein data is read from a target track (step 24), and an off-track read capability (OTRC) is generated for a plurality of segments of the target track (step 26).

Figure 1:
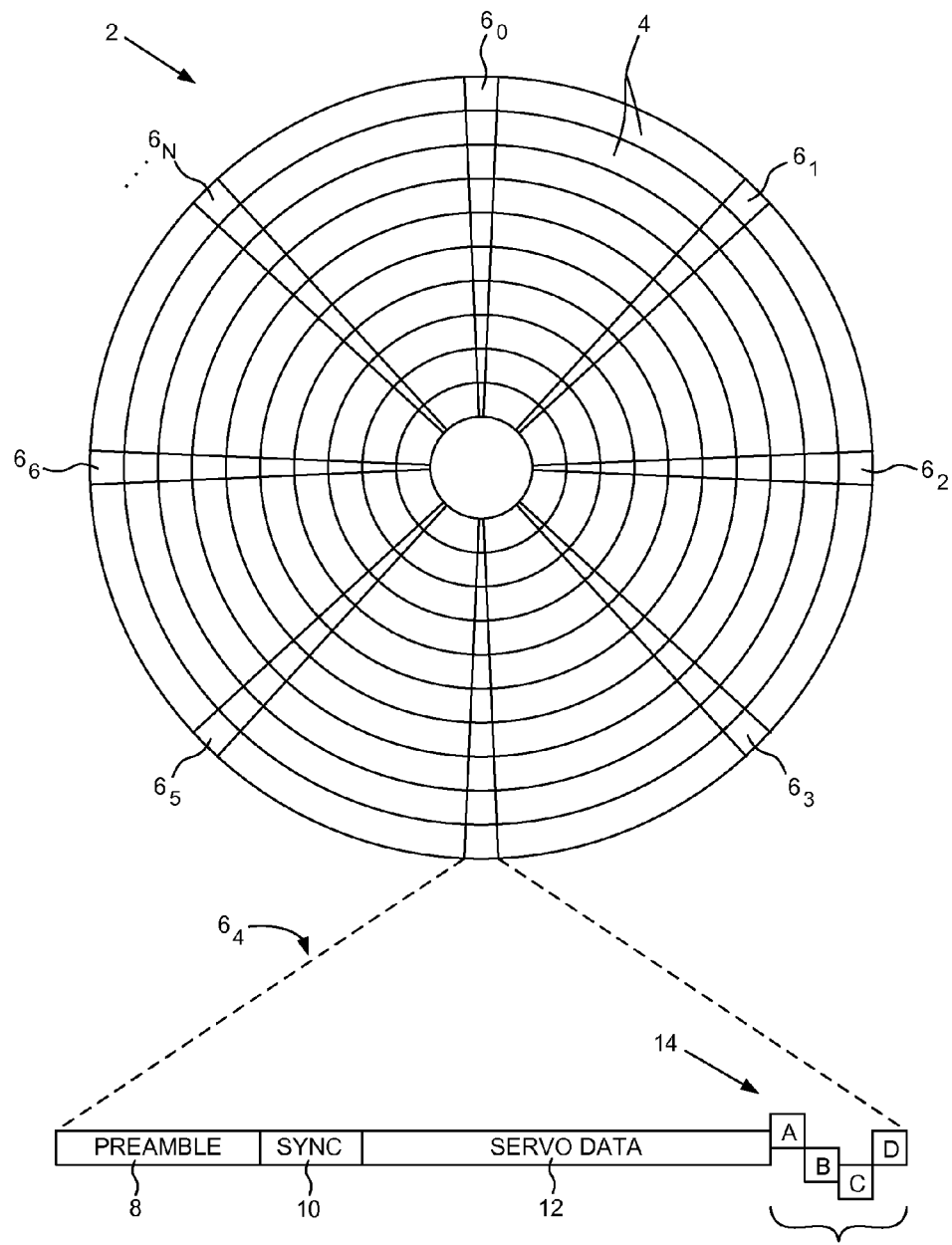
FIG. 1 shows a prior art disk format comprising a plurality of tracks defined by embedded servo sector.

In the embodiment of FIG. 2A, the disk 18 comprises embedded servo sectors $28_0$-$28_N$ that define the tracks 20. The control circuitry 22 processes a read signal 30 emanating from the head 16 to demodulate the servo sectors $28_0$-$28_N$ and generate a position error signal (PES) representing an error between the actual position of the head and a target position relative to a target track. The control circuitry 22 filters the PES using a suitable compensation filter to generate a control signal 32 applied to a voice coil motor (VCM) 34 which rotates an actuator arm 36 about a pivot in order to actuate the head 16 radially over the disk in a direction that reduces the PES. The servo sectors $28_0$-$28_N$ may comprise any suitable position information, such as a track address for coarse positioning and servo bursts for fine positioning. The servo bursts may comprise any suitable pattern, such as the amplitude-based servo pattern shown in FIG. 1A, or a suitable phase-based servo pattern.

FIG. 2C shows an embodiment of the present invention wherein the OTRC is generated for a segment of the target track by measuring a suitable OTRC metric relative to a threshold and an off-track offset. That is, the head is moved incrementally off-track from center toward the outer diameter (OD) of the disk and toward the inner diameter (ID) of the disk. The OTRC for the OD and ID is defined as the off-track offset where the OTRC metric exceeds a threshold. In the embodiment of FIG. 2C, the OTRC is defined as the off-track offset where the OTRC metric is greater than a threshold. In another embodiment, the OTRC may be defined relative to when the OTRC metric falls below a threshold (i.e., the curve shown in FIG. 2C may be inverted depending on the OTRC metric employed).

FIG. 2D shows an example OTRC generated for a plurality of segments of a target track (the OTRC shown in FIG. 2D may be generated toward an OD, or ID, or average thereof). An OTRC may be generated for any suitable sized segment of the target track, for example, each segment may comprise one or more data sectors. In one embodiment, each segment may comprise a wedge of data defined between consecutive servo sectors as shown in FIG. 2A. The segments may comprise contiguous data sectors around the circumference of the target track, or alternatively there may be a gap between at least two of the segments. For example, an OTRC may be generated for discrete points around the circumference of the target track, where each discrete point may comprise one or more contiguous data sectors separated by a gap comprising one or more data sectors. In yet another embodiment, each segment may comprise one or more servo sectors.

Figure 3:
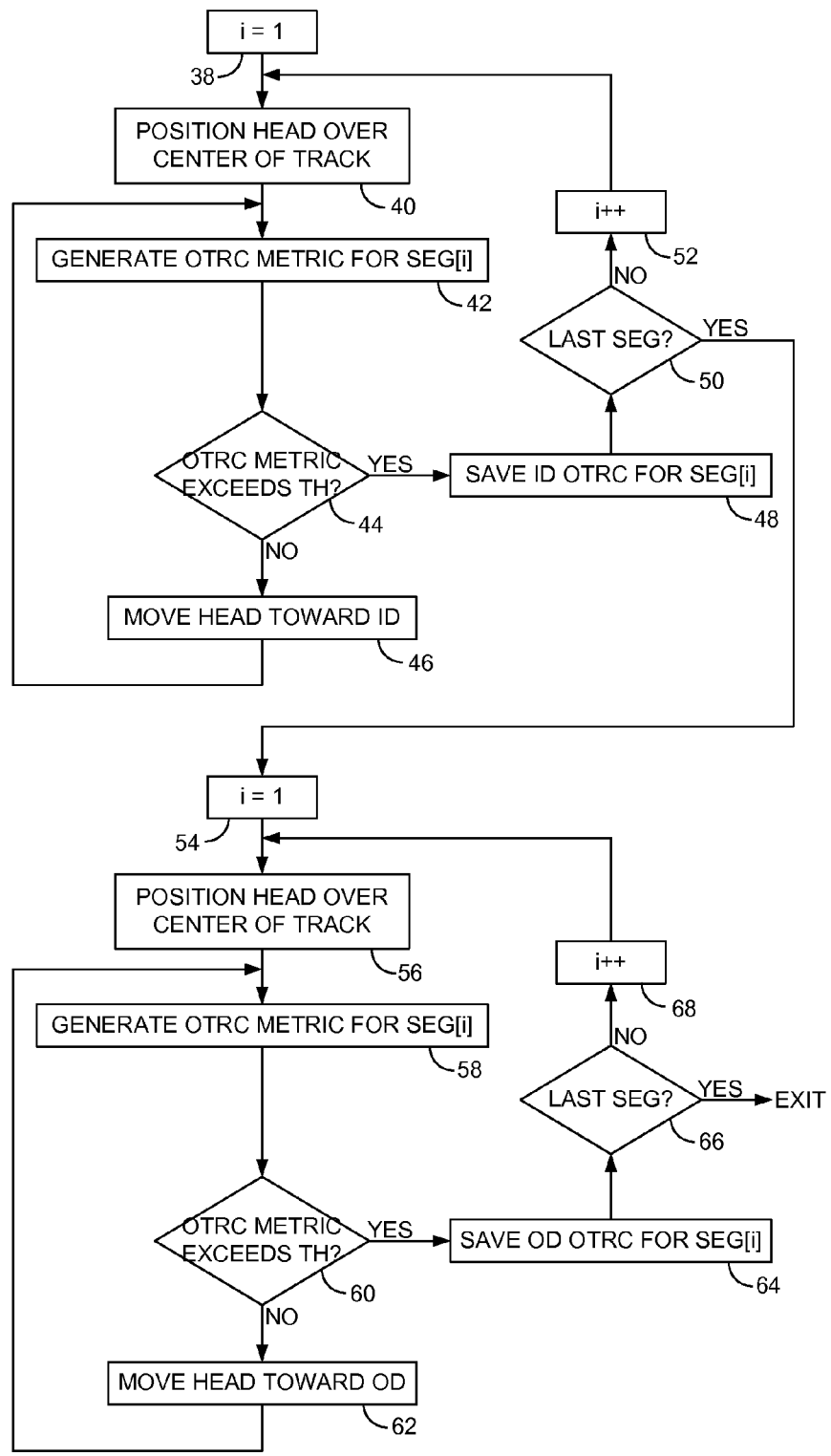
FIG. 3 is a flow diagram according to an embodiment of the present invention wherein an OTRC is generated for each segment relative to when an OTRC metric exceeds a threshold.

FIG. 3 is a flow diagram according to an embodiment of the present invention wherein a segment counter is initialized to one (step 38) and the head is positioned over a center of a target track (step 40). An OTRC metric is generated for the current segment (step 42), and if the OTRC metric does not exceed a threshold (step 44), the head is moved toward the ID of the disk (step 46). The process is then repeated starting with step 42 until the OTRC metric exceeds the threshold (step 44). The ID OTRC (off-track offset) is then saved for the current segment (step 48), and if there are more segments to process (step 50), the segment counter is incremented (step 52) and the process is repeated starting with step 40 until an ID OTRC has been generated for each segment of the target track.

The segment counter is then reset to one (step 54) and the head repositioned over the center of the target track (step 56). An OTRC metric is generated for the current segment (step 58), and if the OTRC metric does not exceed a threshold (step 60), the head is moved toward the OD of the disk (step 62). The process is then repeated starting with step 58 until the OTRC metric exceeds the threshold (step 60). The OD OTRC (off-track offset) is then saved for the current segment (step 64), and if there are more segments to process (step 66), the segment counter is incremented (step 68) and the process is repeated staring with step 56 until an OD OTRC has been generated for each segment of the target track.

In an alternative embodiment, an OTRC metric (ID or OD) may be generated for every segment of the target track during each revolution of the disk (rather than generating an OTRC metric for a single segment as in FIG. 3). As the OTRC metric exceeds the threshold for a given segment, the current off-track offset is saved as the OTRC for the segment. In this embodiment, the process ends when the OTRC metric exceeds the threshold for all of the segments (while moving the head toward the ID and then toward the OD).

Any suitable OTRC metric may be measured when generating the OTRC for each segment of a target track. FIG. 4A shows an embodiment of the present invention wherein the OTRC metric comprises a ratio of a number of data sectors in error to the total number of data sectors read. The OTRC metric may be generated over a single revolution of the disk or over multiple revolutions of the disk wherein the data sectors of a segment are read multiple times. A data sector may be considered in error if it is unrecoverable using an error correction code (ECC), or if the data sector is recoverable but a number of ECC symbols in error exceeds a threshold. FIG. 4B shows an embodiment of the present invention wherein the OTRC metric comprises a ratio of a number of ECC symbols in error to a total number of ECC symbols read, regardless as to whether any particular data sector of the segment is considered in error. FIG. 4C shows an embodiment of the present invention wherein the OTRC metric comprises a ratio of a number of bit errors to a total number of bits read, regardless as to whether any particular data sector of the segment is considered in error. FIG. 4D shows an embodiment of the present invention wherein the OTRC metric comprises a ratio of a number of channel metrics that exceed a threshold to a total number of channel metrics generated. Any suitable channel metric may be measured to generate the OTRC metric, such as a mean squared error of actual read signal samples to expected signal samples, gain errors, timing errors, sequence detector metrics (e.g., Viterbi branch metrics or log likelihood ratios of an iterative detector), etc.

In one embodiment, a known pattern is written to the data sectors of a target track so that the OTRC metric may be accurately generated when reading the data sectors. For example, the detected data sequence generated when reading a data sector may be compared to the known data sequence in order to generate bit errors, or the known data sequence may be used to generate channel metrics, such as expected read signal samples for comparison to the actual read signal samples.

Figure 5A:
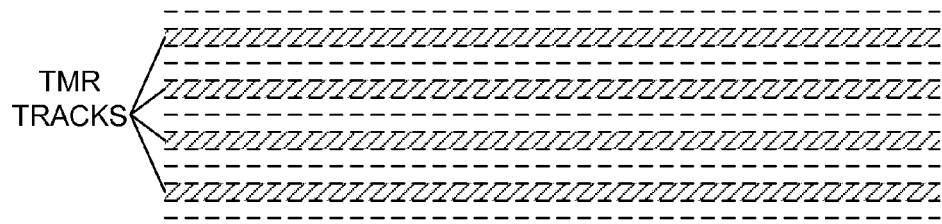
FIG. 5A shows an embodiment of the present invention wherein the target track comprises every third track written out of a plurality of tracks.
Figure 5B:
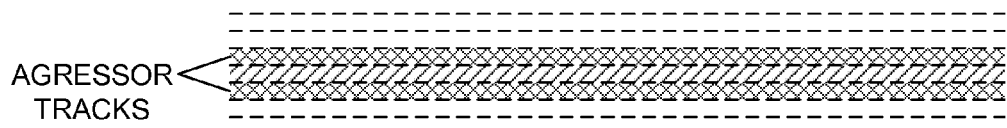
FIG. 5B shows an embodiment of the present invention wherein aggressor tracks adjacent the target track are written prior to generating the OTRCs for the target track.

The OTRC may be generated for a target track by writing to the target track in any suitable manner. FIG. 5A shows an embodiment of the present invention wherein every third track is written, and then an OTRC is generated for the written tracks. In this embodiment, the OTRC is affected mainly by general track misregistration (TMR) rather than interference caused by writing to adjacent tracks. In an embodiment shown in FIG. 5B, a target track may be written with a test pattern, and then aggressor tracks adjacent to the target track may be written one or more times in order to degrade the target track due to adjacent track interference. In one embodiment, the aggressor tracks may be "squeezed" toward the target track in order to enhance the affect of adjacent track interference. After writing the aggressor tracks, the target track is read in order to generate the OTRC for the target track.

Figure 5C:
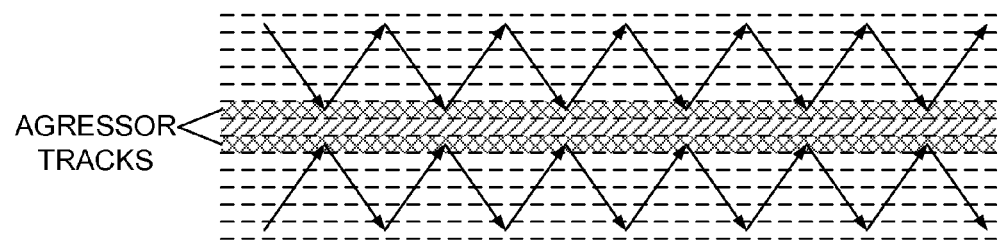
FIG. 5C shows an embodiment of the present invention wherein the aggressor tracks are written after periodically seeking to the aggressor tracks.
Figure 5D:
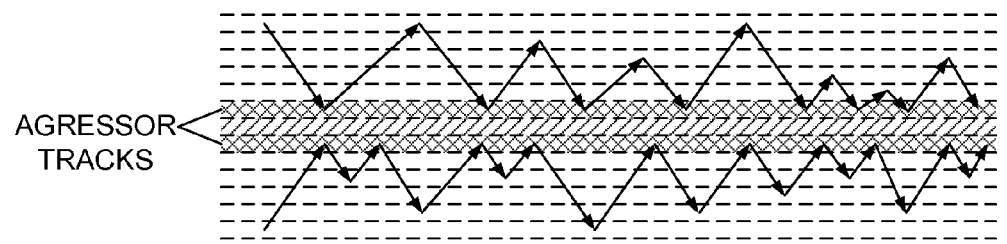
FIG. 5D shows an embodiment of the present invention wherein the aggressor tracks are written after randomly seeking to the aggressor tracks.

FIG. 5C shows an embodiment of the present invention wherein a seek operation may be executed in order to seek the head to an aggressor track prior to writing to the aggressor track. In this embodiment, the aggressor track is written after performing each seek operation, and then the head is moved away and then moved back to the aggressor track so that the seek operations terminate at a periodic location around the circumference of the disk as illustrated in FIG. 5C. In this manner, the adjacent interference that occurs due to the settling oscillations of the head will degrade the target track prior to generating the OTRC for the target track. In an alternative embodiment shown in FIG. 5D, random seeks to the aggressor tracks may be executed prior to writing the aggressor tracks to better simulate the normal, in-the-field operation of a disk drive.

Figure 6A:
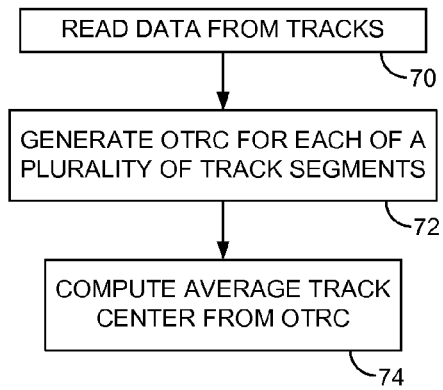
FIG. 6A shows a flow diagram according to an embodiment of the present invention wherein an average track center is computed from the OTRCs generated for a target track.

The OTRC generated for a target track may be used for any suitable purpose. For example, in a flow diagram shown in FIG. 6A, after reading data from a plurality of target tracks (step 70) and generating an OTRC for each of a plurality of segments for each target track (step 72), an average track center is computed from the OTRCs (step 74). In one embodiment, the average track center is computed by first computing a center of each segment:

$$\text{seg\_center}[i] = \frac{\text{OD\_OTRC} - \text{ID\_OTRC}}{2}$$

The average track center is then computed as:

$$AveCenter = \frac{1}{NumTracks \cdot NumSegs} \sum_{trk=1}^{Max} \sum_{seg=1}^{Max} \text{seg\_center}(trk, seg)$$

Figure 6B:
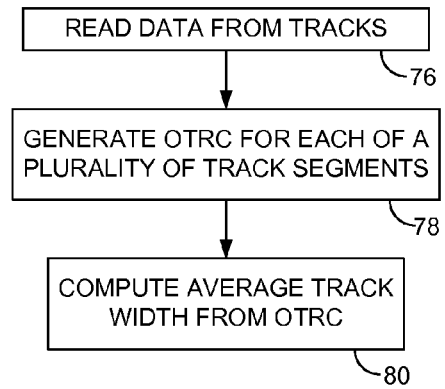
FIG. 6B shows a flow diagram according to an embodiment of the present invention wherein an average track width is computed from the OTRCs generated for a target track.

FIG. 6B is a flow diagram according to an embodiment of the present invention wherein after reading data from a plurality of target tracks (step 76) and generating an OTRC for each of a plurality of segments for each target track (step 78), an average track width is computed from the OTRCs (step 80). In one embodiment, the average track width is computed by first computing a width of each segment:

$$\text{seg\_width}[i] = \frac{\text{OD\_OTRC} + \text{ID\_OTRC}}{2}$$

The average track width is then computed as:

$$AveWidth = \frac{1}{NumTracks \cdot NumSegs} \sum_{trk=1}^{Max} \sum_{seg=1}^{Max} \text{seg\_width}(trk, seg)$$

Figure 6C:
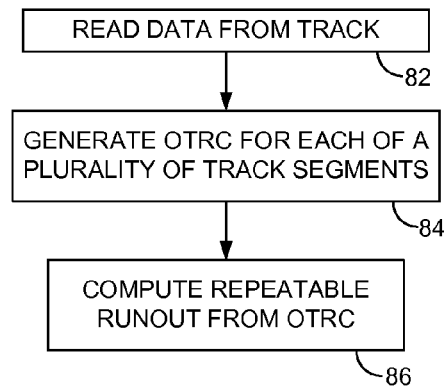
FIG. 6C shows a flow diagram according to an embodiment of the present invention wherein a repeatable runout (RRO) is computed from the OTRCs generated for a target track.

FIG. 6C is a flow diagram according to an embodiment of the present invention wherein after reading data from a target track (step 82) and generating an OTRC for each of a plurality of segments of the target track (step 84), a repeatable runout (RRO) is computed from the OTRCs. In this embodiment, the OTRCs exhibit a sinusoidal response (such as shown in FIG. 2D) due to the eccentricity of the disk as it rotates. The eccentricity is typically caused by a non-centric alignment of the disk with the spindle motor, or a non-centric error in writing the servo sectors to each disk surface. Any suitable technique may be employed to compute the RRO form the OTRCs, such as by computing a Fourier transform and extracting the fundamental frequency and/or harmonics of the OTRCs.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks;
   a head actuated over the disk; and
   control circuitry operable to:
      read data from a target track, including to read data from a first segment and from a second segment; and
      generate a first off-track read capability (OTRC) for the first segment and generate a second OTRC for the second segment, wherein the first OTRC is different from the second OTRC.

2. The disk drive as recited in claim 1, wherein the control circuitry is further operable to:
   generate a first and second OTRC metric for the first and second segment while adjusting an off-track offset used to read the first and second segment; and
   generate the first and second OTRC for the first and second segment relative to when the corresponding first and second OTRC metric exceeds a threshold.

3. The disk drive as recited in claim 1, wherein:
   the target track comprises a plurality of data sectors; and
   each segment comprises a plurality of the data sectors.

4. The disk drive as recited in claim 3, wherein:
   the target track comprises a plurality of servo sectors; and
   each segment comprises a plurality of the data sectors between consecutive servo sectors.

5. The disk drive as recited in claim 2, wherein the control circuitry is further operable to:
   generate an inner-diameter OTRC metric for the first and second segment while adjusting the off-track offset toward an inner-diameter of the disk; and
   generate an outer-diameter OTRC metric for the first and second segment while adjusting the off-track offset toward an outer-diameter of the disk.

6. The disk drive as recited in claim 2, wherein the control circuitry is further operable to generate the first and second OTRC for the first and second segment relative to a ratio of a number of data sectors in error to a total number of data sectors read.

7. The disk drive as recited in claim 6, wherein a data sector is in error when the data sector is unrecoverable.

8. The disk drive as recited in claim 6, wherein a data sector is in error when a number of error correction code (ECC) symbols exceeds a threshold.

9. The disk drive as recited in claim 2, wherein the control circuitry is further operable to generate the first and second OTRC for the first and second segment relative to a ratio of a number of error correction code (ECC) symbols in error to a total number of ECC symbols read.

10. The disk drive as recited in claim 2, wherein the control circuitry is further operable to generate the OTRC for the first and second segment relative to a ratio of a number of bit errors to a total number of bits read.

11. The disk drive as recited in claim 2, wherein the control circuitry is further operable to generate the OTRC for the first and second segment relative to a ratio of a number of channel metrics that exceed a threshold to a total number of channel metrics.

12. The disk drive as recited in claim 2, wherein the control circuitry is further operable to:
  write to at least one aggressor track adjacent to the target track; and
  after writing the aggressor track, read the target track and generate the first and second OTRC for the first and second segment of the target track.

13. The disk drive as recited in claim 12, wherein the control circuitry is further operable to seek to the aggressor track prior to writing to the aggressor track.

14. The disk drive as recited in claim 2, wherein the control circuitry is further operable to compute an average track center from the first and second OTRC.

15. The disk drive as recited in claim 2, wherein the control circuitry is further operable to compute an average track width from the first and second OTRC.

16. The disk drive as recited in claim 2, wherein the control circuitry is further operable to compute a repeatable runout from the first and second OTRC.

17. A method of operating a disk drive comprising a head actuated over a disk comprising a plurality of tracks, the method comprising:
  reading data from a target track, including to read data from a first segment and from a second segment; and
  generating a first off-track read capability (OTRC) for the first segment and generate a second OTRC for the second segment, wherein the first OTRC is different from the second OTRC.

18. The method as recited in claim 17, further comprising:
  generating a first and second OTRC metric for the first and second segment while adjusting an off-track offset used to read the first and second segment; and
  generating the first and second OTRC for the first and second segment relative to when the corresponding first and second OTRC metric exceeds a threshold.

19. The method as recited in claim 17, wherein:
  the target track comprises a plurality of data sectors; and
  each segment comprises a plurality of the data sectors.

20. The method as recited in claim 19, wherein:
  the target track comprises a plurality of servo sectors; and
  each segment comprises a plurality of the data sectors between consecutive servo sectors.

21. The method as recited in claim 18, further comprising:
  generating an inner-diameter OTRC metric for the first and second segment while adjusting the off-track offset toward an inner-diameter of the disk; and
  generating an outer-diameter OTRC metric for the first and second segment while adjusting the off-track offset toward an outer-diameter of the disk.

22. The method as recited in claim 18, further comprising generating the first and second OTRC for the first and second segment relative to a ratio of a number of data sectors in error to a total number of data sectors read.

23. The method as recited in claim 22, wherein a data sector is in error when the data sector is unrecoverable.

24. The method as recited in claim 22, wherein a data sector is in error when a number of error correction code (ECC) symbols exceeds a threshold.

25. The method as recited in claim 18, further comprising generating the first and second OTRC for the first and second segment relative to a ratio of a number of error correction code (ECC) symbols in error to a total number of ECC symbols read.

26. The method as recited in claim 18, further comprising generating the first and second OTRC for the first and second segment relative to a ratio of a number of bit errors to a total number of bits read.

27. The method as recited in claim 18, further comprising generating the first and second OTRC for the first and second segment relative to a ratio of a number of channel metrics that exceed a threshold to a total number of channel metrics.

28. The method as recited in claim 18, further comprising:
  writing to at least one aggressor track adjacent to the target track; and
  after writing the aggressor track, reading the target track and generate the first and second OTRC for the first and second segment of the target track.

29. The method as recited in claim 28, further comprising seeking to the aggressor track prior to writing to the aggressor track.

30. The method as recited in claim 18, further comprising computing an average track center from the first and second OTRC.

31. The method as recited in claim 18, further comprising computing an average track width from the first and second OTRC.

32. The method as recited in claim 18, further comprising computing a repeatable runout from the first and second OTRC.

* * * * *